United States Patent [19]

Varghese et al.

[11] Patent Number: 5,313,467

[45] Date of Patent: May 17, 1994

[54] INTEGRATED COMMUNICATION LINK HAVING A DYNAMICALLY ALLOCOATABLE BANDWIDTH AND PROTOCOL FOR TRANSMISSION OF ALLOCATION INFORMATION OVER THE LINK

[75] Inventors: George Varghese, Bradford, Mass.; Richard L. Szmauz, New Ipswich, N.H.; Andrew J. Smith, Watertown, Mass.; Michael Fine, San Francisco, Calif.

[73] Assignee: Digital Equipment Corporation, Maynard, Mass.

[21] Appl. No.: 985,249

[22] Filed: Dec. 2, 1992

Related U.S. Application Data

[63] Continuation of Ser. No. 436,742, Nov. 15, 1989, abandoned.

[51] Int. Cl.⁵ .................................... H04Q 11/04
[52] U.S. Cl. .................................... 370/94.1; 370/60
[58] Field of Search .............. 370/94.1, 60, 110.1, 370/84, 105.1, 79, 83, 85.3, 85.12, 85.6, 75.3; 340/825.5

[56] References Cited

U.S. PATENT DOCUMENTS

| | | | |
|---|---|---|---|
| 4,154,983 | 5/1979 | Pedersen | 370/85.3 |
| 4,503,533 | 3/1985 | Tobagi et al. | 370/85.3 |
| 4,538,263 | 8/1985 | Gabrielli et al. | 370/85.12 |
| 4,550,399 | 10/1985 | Caron | 370/84 |
| 4,594,707 | 6/1986 | Merritt et al. | 370/79 |
| 4,625,308 | 11/1986 | Kim et al. | 370/95.3 |
| 4,638,476 | 1/1987 | Acampora et al. | 370/79 |
| 4,665,514 | 5/1987 | Ching et al. | 370/60 |
| 4,713,807 | 12/1987 | Caves et al. | 370/94.1 |
| 4,736,369 | 4/1988 | Barzilai et al. | 370/94.1 |
| 4,763,321 | 8/1988 | Calvignac et al. | 370/94.1 |
| 4,782,484 | 11/1988 | Limb | 370/105.1 |
| 4,819,228 | 4/1989 | Baran et al. | 370/94.1 |
| 4,819,230 | 4/1989 | Calvignac et al. | 370/94.1 |
| 4,821,264 | 4/1989 | Kim | 370/110.1 |
| 4,855,827 | 8/1989 | Best | 358/143 |
| 4,912,702 | 3/1990 | Verbiest | 370/79 |
| 4,912,706 | 3/1990 | Eisenberg et al. | 370/105.1 |

FOREIGN PATENT DOCUMENTS

| | | |
|---|---|---|
| 0212031 | 3/1987 | European Pat. Off. |
| 0258514 | 3/1988 | European Pat. Off. |
| 57-159152 | 10/1982 | Japan |
| 58-171156 | 10/1983 | Japan |
| 61-001129 | 1/1986 | Japan |
| 62-020439 | 1/1987 | Japan |

*Primary Examiner*—Douglas W. Olms
*Assistant Examiner*—Dang Ton
*Attorney, Agent, or Firm*—Kenyon & Kenyon

[57] ABSTRACT

An integrated communications link in a communications network that is provided with apparatus which allows dynamic allocability of bandwidth among a plurality of channels. At least three different types of information can be carried on these channels, and the bandwidth of these channels are dynamic so that it can be changed according to a determinable scheme. The link also sends error control information with a message that informs the receiver how the bandwidth is to be allocated, this error control information providing an extremely high level of assurance that the receiver of the information will know how the received information is to be allocated.

68 Claims, 7 Drawing Sheets

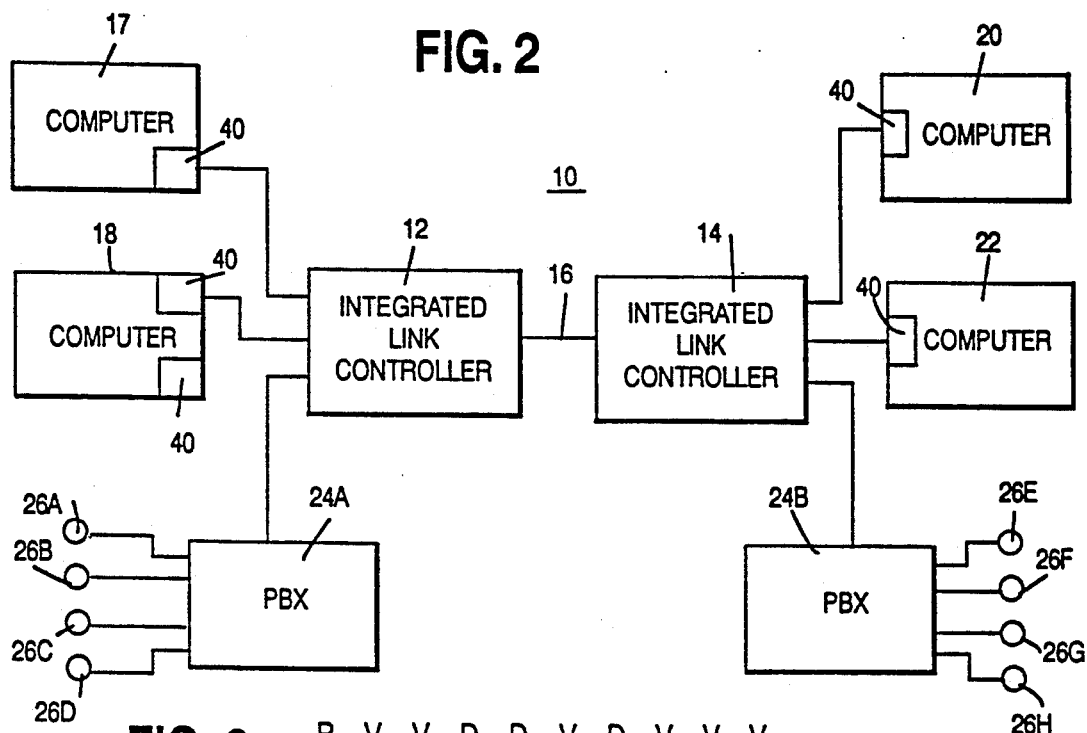
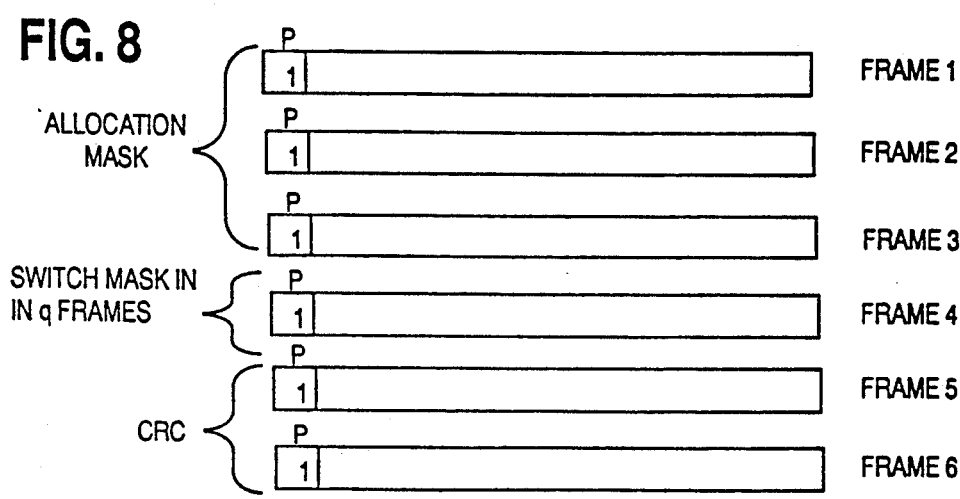

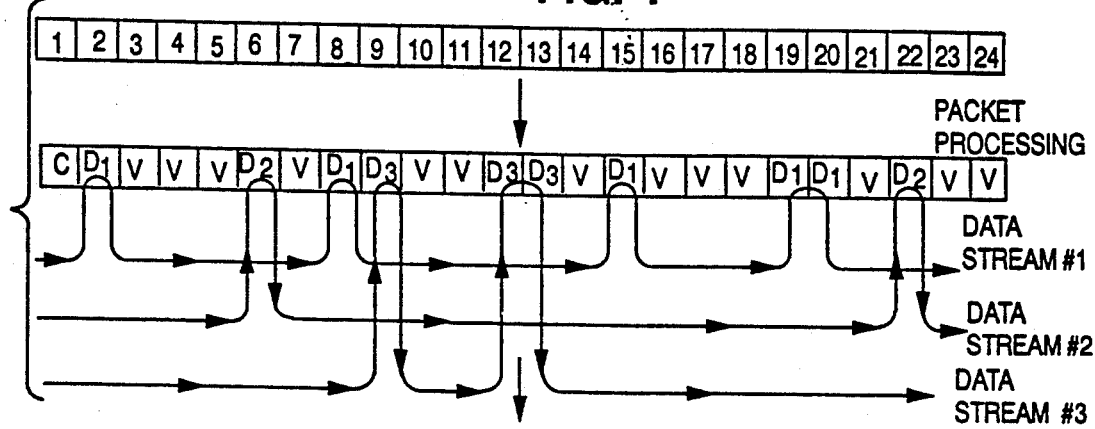
FIG. 4
FIG. 5a
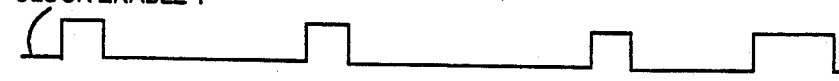
FIG. 5b
FIG. 5c
FIG. 5d
FIG. 5e
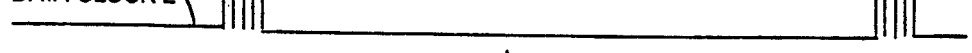
FIG. 5f
FIG. 5g
FIG. 6
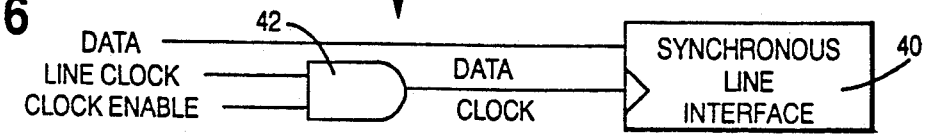

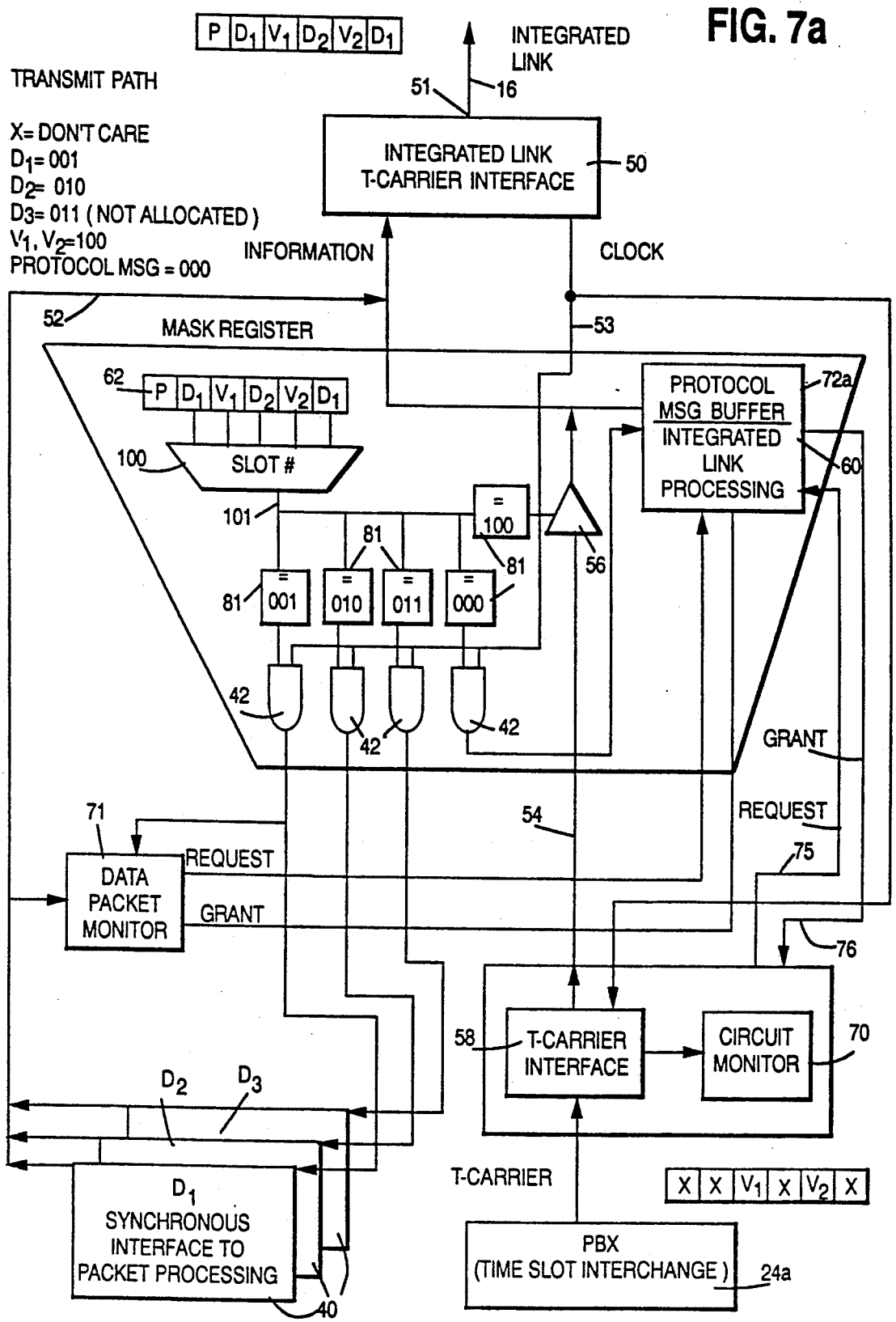

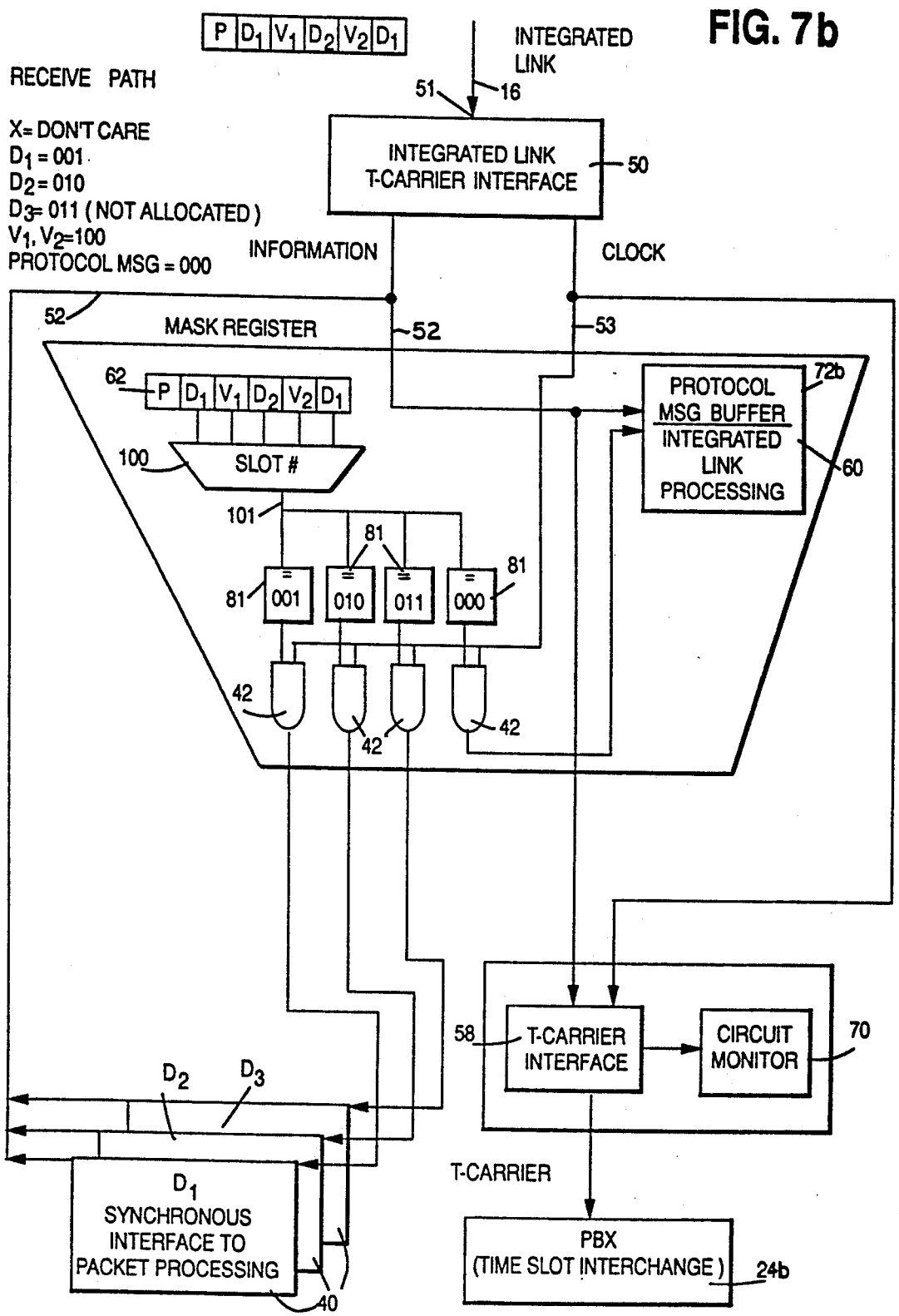

INTEGRATED COMMUNICATION LINK HAVING A DYNAMICALLY ALLOCOATABLE BANDWIDTH AND PROTOCOL FOR TRANSMISSION OF ALLOCATION INFORMATION OVER THE LINK

This is a continuation of application Ser. No. 07/436,742 filed on Nov. 15, 1989, now abandoned.

FIELD OF THE INVENTION

The present invention relates to an integrated communications link in a communications network. More particularly, the invention relates to an integrated multiplexed link having dynamically allocatable bandwidth among a plurality of channels, and a protocol for the transmission of allocation information over the integrated link.

BACKGROUND OF THE INVENTION

In today's world, there is a growing requirement for transferring different types of information over various distances via communications links. This information can be, for example, data generated by a computer, imaging data from a video camera, or any other of a number of different forms of data. This data often has to share the communications link with voice circuits that carry human conversations.

In modern communication systems, the carrying of multiple conversations over a common link is most frequently accomplished by the well-known methods of time division multiplexing (TDM) or frequency division multiplexing (FDM). One common multiplexing system is the American T1 system which has a link of 1.544 Mbit/sec that is divided into 24 slots of 64 Kbit/sec. This division is implemented by continuously sending "frames" of 192 bits. Each frame is divided into 24 slots, so that each slot has 8 bits. Since each slot can carry a different conversation, 24 different conversations can be carried simultaneously over the T1 system link, with 8 bits of each conversation transmitted every frame.

The different types of information (voice, data, image, etc.) that can be carried over a link have different transmission characteristics and requirements. For example, voice information (a conversation) is characterized by low to medium bandwidth and low latency. Latency is the period of time between the occurrence of an event and the time at which the event is recognized, while bandwidth is defined here as the bits transmitted per second. (Since a defined number of frames are transmitted per second, the number of bits allocated within a single frame will also be referred to as bandwidth). By contrast, computer data can have low to high bandwidth and relatively high latency. Image data can have extremely high bandwidth and low to high latencies.

As stated above, the different types of information must often be carried over the same link. There is, for example, at least one proposed system that provides an integrated network that carries both data and voice information over the same link. (For ease of description, all other types of information besides voice, such as computer data, image information, etc., will be henceforth referred to as "data".) This network is the Integrated Services Digital Network (ISDN), proposed as an industry standard.

The ISDN network allows both voice and data to be carried over the same link, with voice occupying some slots, and data occupying other slots, with at least one slot acting as a control slot. The information carried in the control slot tells the receiver how the slots in each frame are allocated, i.e., which slots are assigned to which receivers at any particular time. An example follows, with reference to FIG. 1.

The 24 slots of a frame carried by the ISDN system is shown in FIG. 1. The first slot is a slot for control, and is thus the control channel. The remaining 23 slots can be assigned to 23 different, simultaneous transfers of information. Each separate transfer of information is labeled a channel, so that the ISDN system can support up to 23 separate channels, and one control channel. However, each channel can occupy one or more contiguous slots.

The ISDN system suffers from a number of drawbacks. One of these drawbacks is its inflexibility in its allocation of slots. For example, assume that one type of information transfer needs higher bandwidth than can be provided by one slot. In the ISDN system, this is accomplished by grouping together a number of contiguous slots, to form a channel having higher bandwidth since each frame is now allocated to carry more information for that particular information transfer.

The requirement that the slots be contiguous for information carried over the same channel leads to inefficient use of the link in the ISDN systems. This is because certain allocations can cause, for example, only single slots to be available when a channel needs two or more contiguous slots. In such a circumstance, either the channel waits for two contiguous slots to become free, or a re-allocation must be performed. In either case, the link is being inefficiently used.

Another drawback to the ISDN system is the relatively long time it takes to change the allocation scheme of the slots When the allocation scheme is to be changed, the sender sends the receiver the new allocation scheme. Upon receipt of the new allocation scheme, the receiver will then send back an acknowledgment signal. The sender starts sending information according to the new allocation scheme only when it receives the acknowledgment signal from the receiver. During this whole time period, no useful information can be sent because both sender and receiver cannot be sure that the receiver has the correct new allocation scheme until after the sender receives the acknowledgment signal. When the link spans the entire country so that the propagation of the signals takes a relatively long time (30 m sec, for example), the acknowledgment method of changing the allocation scheme is undesirably slow.

A need therefore exists for an integrated network that can carry both voice and data over the same link, this network providing flexibility in its allocation of slots. The network should also be able to switch the allocation scheme very quickly and transparently, so that information can be transferred during the switching process.

SUMMARY OF THE INVENTION

The present invention provides a system having an integrated link that carries multiple types of information in a multiplexed manner. The system has a multiplexed integrated link that carries multiple information signals in a framed format. Each information signal occupies an allocated amount of bandwidth in a portion of each frame in the framed format Two integrated link controllers are coupled to the ends of the multiplexed integrated link. Each integrated link controller is operable as a transmitter and as a receiver. The system has means for dynamically changing the allocation of the bandwidth of the information signals, where the bandwidth of each individual information signal is allocatable among contiguous or noncontiguous portions of the frame.

The dynamic allocation of the bandwidth of the information signals according to the present invention provides an integrated link of great flexibility. This is because the allocation of the bandwidth of each individual information signal on the multiplexed integrated link can be dynamically changed to accommodate the bandwidth and the latency requirements of different types of information signals. For example, if one of the information signals is image data, the image data can be allocated a relatively large bandwidth. Other types of information signals, such as data from a computer, can be provided the appropriate bandwidth as needed.

The dynamic changing of the allocation of the bandwidth also allows the multiplexed integrated link to carry voice signals. One type of allocation policy provides that voice signals have precedence over other types of information signals However, to provide full utilization of the integrated link, when a voice signal is no longer being used, the allocation of the bandwidth can be quickly and dynamically changed to allow other data to be transmitted over the bandwidth vacated by the voice circuit.

The present invention also provides greater flexibility in its allocation of bandwidth since an individual information signal is allocatable among contiguous or non-contiguous portions (or slots) of the frame Therefore, an individual information signal does not have to wait for two contiguous slots to be free before it is allocated those slots The present invention also provides a fast protocol for dynamically changing the allocation of the bandwidth of the information signals. Protocol information is transferred from a transmitting integrated link controller to a receiving integrated link controller. Part of the protocol information is an allocation mask which indicates how the slots of each frame are allocated to the various information signals. The transmitting integrated link controller uses the allocation mask to multiplex voice and data information into their allocated slots in the frame, while the receiving integrated link controller uses the allocation mask to pick apart the received frames. Therefore, both the transmitting and receiving link controllers need to use the same mask for a given frame.

Protocol information can be sent vertically, i.e. spread out over successively transmitted frames. Furthermore, since the bandwidth in a particular frame can be dynamically changed, the bandwidth of the protocol channel, and thus the speed of switching allocation masks, can be easily changed to suit a particular application. The present invention therefore allows an adjustable trade-off of protocol bandwidth (or control overhead) with the speed of switching masks Robustness (the ensuring of accuracy) is also adjustable and can be traded off with bandwidth and speed in the present invention. Protocol information is repetitively sent a certain number of times, this number being adjustable. The more times the information is repeated, the more robust the transfer of protocol information will be. This will be at the expense of mask switching speed and/or bandwidth.

Another advantage of the protocol of the present invention is that no acknowledgment signal by the receiving integrated link controller is necessary, thereby making bandwidth allocation faster and more efficient, as described in the next paragraph. This is because the protocol information is repeated in protocol packets, and if merely one of these protocol packets is determined to be a correct protocol packet, the transmitting and receiving integrated link controllers will both have the same allocation masks with a high degree of confidence.

The protocol of the present invention also has the advantage that useful information can be transferred while the protocol information is being transmitted. This is due to the fact that the protocol information is sent over only a portion of a frame, leaving the rest of the frame for continuing information transfers.

BRIEF DESCRIPTION OF THE DRAWINGS

FIG. 1 illustrates a conventional 24 slot frame.

FIG. 2 illustrates a system constructed in accordance with an embodiment of the present invention.

FIG. 3 illustrates the first ten slots of an exemplary frame.

FIG. 3A illustrates the exemplary frame of FIG. 3 that has had its slots reallocated according to the embodiment of the present invention.

FIG. 4 illustrates another example of a frame.

FIG. 5a illustrates a line clock generated by the present invention.

FIGS. 5b, 5d and 5f illustrate clock enable signals for the respective data channels illustrated in FIG. 4.

FIGS. 5c, 5e and 5g illustrate the data clock signals generated by the present invention for the respective data channels illustrated in FIG. 4.

FIG. 6 shows an exemplary embodiment of an arrangement to provide the data clock signal to a synchronous line interface.

FIGS. 7a and 7b show exemplary embodiments of transmitting and receiving integrated link controllers.

FIG. 8 shows six successive frames, with only the protocol channel for each frame being shown.

DETAILED DESCRIPTION

Figure 9A:
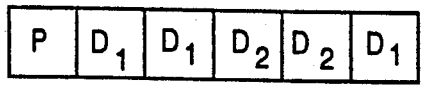
FIGS. 9a and 9b show examples of an allocation mask before and after voice circuits replace data channels in the allocation mask.

To understand the type of communication services provided by the present invention, a network comprising integrated links will first be described. This will be the basis for a following description of an embodiment according to the present invention of a transmitting and receiving integrated link controller. The derivation of explicit allocation mask encoding illustrated in the embodiment will then be described along with an enhanced implicit encoding technique used to provide more efficient protocol channel utilization. The parameters and operation of this protocol channel will then be described for the invention.

An example of a system 10 constructed in accordance with an embodiment of the present invention is shown in FIG. 2. The system 10 has a time division multiplexed link, such as the North American T1 link, comprising integrated link controls 12, 14 and a link 16 coupling the two integrated link controls 12, 14. The standard T1 link provides the necessary framing information to allow integrated link processing according to the present invention.

A synchronous time division multiplexed frame structure provides a frame of fixed duration that is subdivided into an integral number of time slots. The North American T1 frame structure defines a frame duration of 125 microseconds that is subdivided into 24 time slots made up of eight bits each. Each time slot has a duration of 5.18 microseconds. An additional framing bit provides for a total line bandwidth of 1.544 Mbits/second where each time slot has an effective transfer rate of 64 Kbits/second.

It should be recognized that any type of multiplexed link could be used, for example, the European link which provides frames divided into 30 time slots. Further, it is contemplated to use frequency division multiplexed links instead of time division multiplexed links.

The integrated link controller 12 is coupled to two computers 17, 18 through separate synchronous line interfaces 40. The integrated link controller 12 is also separately coupled to a private branch exchange (PBX) 24A. Separate telephone units 26A–26D are coupled to the PBX 24A.

At the other end of the link 16, the integrated link controller 14 is similarly coupled to computers 20, 22 and a PBX 24B. The PBX 24B, in turn, is coupled to telephone sets 26E–26H.

Figure 13:
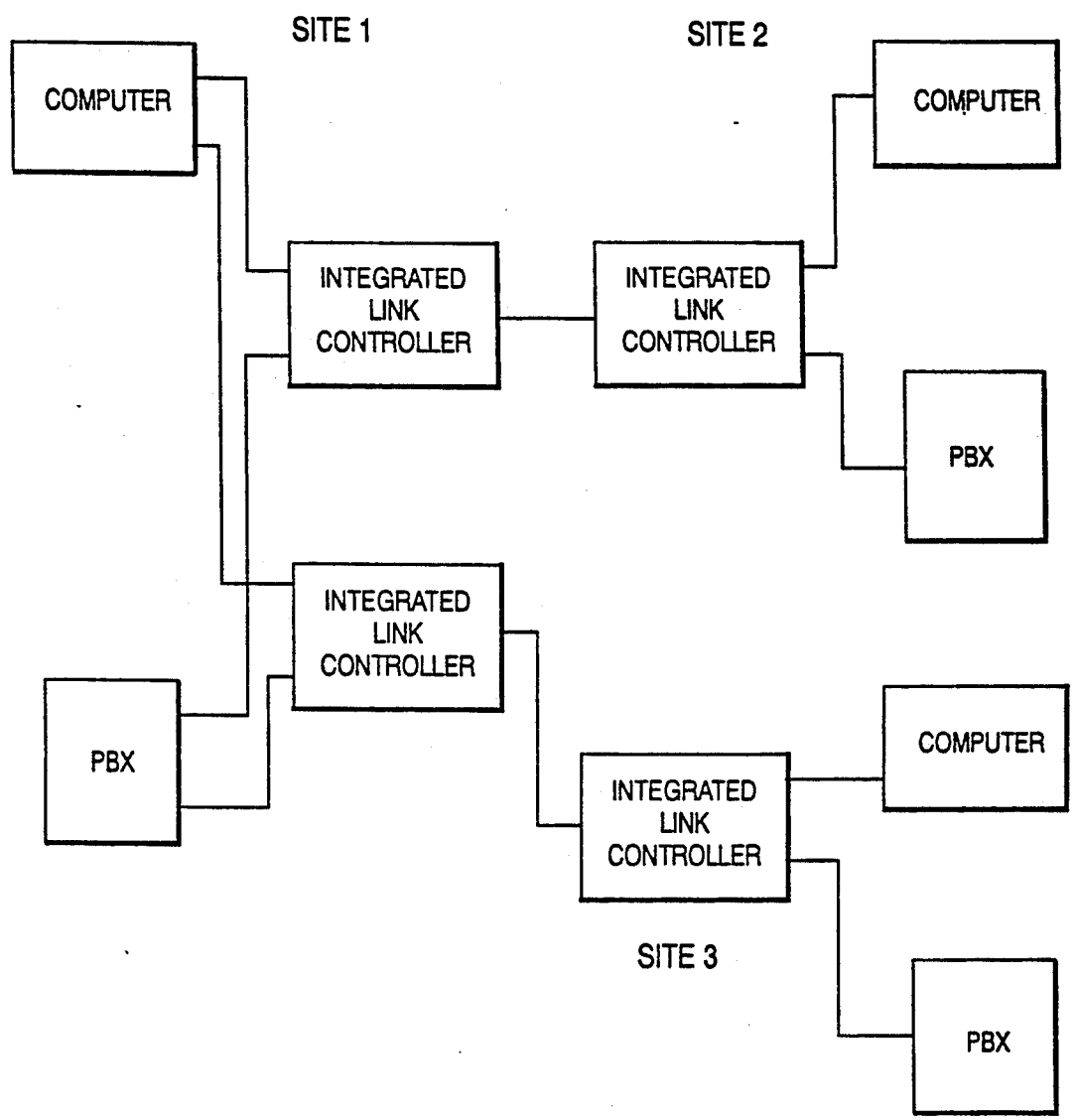
FIG. 13 illustrates a point-to-multipoint coupling of integrated link controllers constructed in accordance with an embodiment of the present invention.

The arrangement of FIG. 2 is merely exemplary, such that the integrated link controllers 12, 14 can be coupled to any number of different information sources and receivers. Further, although a point-to-point connection is illustrated as an example for the sake of description, more complex networks with point-to-multipoint connections are easily accomplished with the present invention. This is shown, for example, in FIG. 13.

For the following discussion, integrated link controller 12 will be considered the sender or transmitter, while the integrated link controller 14 will be the receiver. The computers 17, 18 and the PBX 24A will be termed the sources, while the computers 20, 22 and PBX 24B will be termed the destinations. Although the terms transmitters and receivers are used for the following description, it should be apparent that the transmitting integrated link controller 12 has a companion receiver and the receiving integrated link controller 14 has a companion transmitter, so that simultaneous two-way communication is provided.

The system 10 of FIG. 2 transfers information in frames, as discussed earlier. FIG. 3 shows an exemplary allocation of a frame, with only ten slots out of the twenty-four slots being shown. The first slot, slot 1, carries control, or protocol information. This slot therefore carries the protocol channel. Note that there is a distinction between the terms "slot" and "channel". While a channel may comprise a single slot, a single channel can also comprise multiple slots.

A voice circuit, $V_A$, is established over channel 2 in slot 2, and a separate voice circuit, VB, is established over channel 3 in slot 3. Data from a data source, such as computer 17, is transmitted over channel 4 in slot 4. This data stream is referenced as DA. A second data source, such as computer 18, transmits a data stream DB over channel 5 in slot 5.

In similar fashion, four more voice circuits VC, VD, VE, VF are transmitted over the channels 6, 8, 9 and 10 respectively in slots 6, 8, 9 and 10. Also, a third data channel is established for data DC over channel 7. The remaining slots 11–24 (not shown) carry further voice circuits or data transmissions.

The bandwidth (the amount of bits in a frame) allocated between voice and data is dynamic. An example illustrates this dynamic allocation of bandwidth. Assume the system has a pre-determined policy in which voice circuits have priority over data transmissions for bandwidth. In other words, when a voice circuit needs to be established, a data source must relinquish its slot (and bandwidth). In FIG. 3a, a frame is shown in which two additional voice circuits carrying voice information VG and VH are established. The voice circuits VG, $V_H$ are established over channels 4, 5 and replace the data transmissions DA, DB which were previously transmitted over channels 4, 5.

The same exemplary policy can also dictate that when a slot becomes vacant and is not needed for a voice circuit, one of the data channels will occupy the slot so that the data channel will have a higher bandwidth. Alternatively, another data source could fill the slot no longer occupied by the voice circuit. This policy dynamically allocates the bandwidth of the link so that each slot is constantly used. Other policies, reflecting various demands of a particular system, can also be used. The invention allows different policies to be used since it is flexible in its dynamic allocation of bandwidth.

An example of a typical frame is shown in FIG. 4. In this example, there are three different data streams, D1, D2, D3 generated by three different sources of data. As can be seen from the diagram, the first slot of every frame is used for protocol bits. As will be explained later, this protocol information can be expanded to more than one slot, made less than one complete slot, or completely removed from the frame. The first data stream, D1, is transmitted on slots 2, 8, 15, 19 and 20. The second data stream, D2, is transmitted on slots 6 and 22. The third data stream, D3, is transmitted on slots 9, 12 and 13.

For compatibility reasons, it is important that the destinations of data packets (i.e. computers 20, 22) receive the data packets in continuous packet streams rather than asynchronously. Since a data stream may be spread out over several non-contiguous slots, such as data stream D1, some technique is required to transparently create a continuous packet stream. This is performed in the present invention using a "stutter clock".

Referring to FIG. 6, each destination of data (as opposed to voice) has a synchronous line interface 40 that expects to receive data synchronously with a clock signal. The stutter clock technique described below provides the synchronous line interface 40 with a data clock signal that is synchronous with the data meant for that particular synchronous line interface 40. As can be seen in FIG. 6, the clock input of synchronous line interface 40 is coupled to the output of an AND gate 42. The AND gate 42 receives at its inputs a line clock signal and a clock enable signal. The data signal and the output of AND gate 42 are sent to the synchronous line interface 40 by the receiving integrated link controller 14.

Referring to FIGS. 5a-5g, FIG. 5a shows the line clock signal that is sent from the receiving integrated link controller 14 to all of the synchronous line interfaces 40. The clock enable 1 signal is sent by the receiving integrated link controller 14 only to the appropriate synchronous line interface 40 according to an allocation mask stored in the receiving integrated link controller 14. This mask, and its determination from the protocol signals sent over the protocol channel will be described in more detail later.

For receiving data channel D1, the receiving integrated link controller 14 will therefore send out the clock enable 1 signal which will have logical highs that correspond to the slots on which data for data stream 1 is sent. In this example, the clock enable 1 signal will be high during slots 2, 8, 15, 19 and 20 (FIG. 5b). When the clock enable 1 signal is high, the data clock 1 signal (FIG. 5c) will be received at the synchronous line interface 40 synchronously with the data meant for the destination. In other words, the synchronous line interface 40 for a particular destination will only receive data meant for that particular destination at the same time as it receives the data clock signal. The destination is unaware of any gaps in the data stream since its synchronous line interface 40 is not clocked during the portions of the frame allocated to voice circuits and other data streams. This allows the use of standard synchronous line interfaces 40, so that they do not have to be adapted to be coupled to the system 10. The remaining FIGS. 5d-5g show the clock enables and data clocks for the two other data streams D2, D3 that are sent to different destinations.

The following describes the transmission and reception of information over the integrated link using the integrated link controllers operating as a transmitter and a receiver. The information can include different types of information, such as data, voice, and protocol information. Specific methods for encoding the protocol information will be described separately later.

An embodiment of the transmitting path in an integrated link controller 12 is shown in FIG. 7A. The transmitting integrated link controller 12 has an integrated link T-carrier interface 50 with an output 51 coupled to the integrated link 16. The output 51 of the interface 50 carries the voice information from the voice channels, and the data from the data channels, in an integrated fashion. The information sent to the interface 50 is provided on line 52 from each of the synchronous line interfaces 40 coupled to the various sources and a transmit protocol message buffer 72a. The voice channels are carried over a line 54 through a gate 56 to the interface 50. The gate 56 is enabled during the transmission of the appropriate slot as described in the following paragraphs. The voice channels are provided from the PBX 24A to the T-carrier interface 58. The T-carrier interface 58 sends the voice channels over line 54 to the transmit gate 56. The T-carrier interface 58 is coupled to the voice channels of PBX 24A in a conventional manner.

When the voice channels request the use of a slot at T-carrier interface 58 by conventional means, circuit monitor 70 detects this occurrence. Circuit monitor 70 sends request control information over line 75 to an integrated link processing unit 60. The integrated link processing unit 60 uses the request control information from circuit monitor 70 to generate an allocation mask protocol message and places it in a transmit protocol message buffer 72a. The integrated link processing unit 60 indicates over line 76 that slot usage has been granted to circuit monitor 70. This causes the T-carrier interface 58 to place the voice circuit in the allocated slot. Integrated link processing unit 60 loads a mask register 62 with the information describing the allocation of the multiplexed frame.

The circuit monitor 70 detects in a conventional manner the termination of a voice connection and initiates the removal of the voice slot from the integrated frame by sending information to the integrated line processing unit 60. The integrated link processing unit 60 will place a message indicating the new allocation of slots in the transmit protocol message buffer 72a and then appropriately update the allocation mask register 62 according to the link protocol. In this manner, bandwidth can be added to or taken from the synchronous data channels.

Similarly, a data packet monitor 71 is also provided in the illustrated embodiment. The data packet monitor 71 is enabled by AND gate 42 to extract information from line 52 when synchronous line interface 40 places information from source D1 on the line 52. In this embodiment, data source D1 is selected to control data bandwidth allocation for all the data sources D1-D3. Monitor 71 notifies the integrated link processing control 60 when there is to be a reallocation of bandwidth among the data channel sources D1-D3. The integrated link processing control 60 generates and loads an allocation protocol message into the transmit protocol message buffer 72a. The integrated link processing unit 60 will then load mask register 62 with the information describing the allocation of the multiplexed frame. In the illustrated example in FIGS. 7a and 7b, the slots of the frame are assigned according to whether voice traffic is present. When there are no voice calls active, all the slots are assigned to the protocol channel and data sources in the following manner (where "p" is the protocol channel).

In the illustrated example of a mask allocation seen in FIG. 9a, only two channels D1, D2 are active. D1 is using slots 2, 3 and 6. D2 is using slot 4 and 5. D3 is not allocated to any slot. In this example, only six slots are shown, the invention being applicable for any number of slots.

Figure 9B:
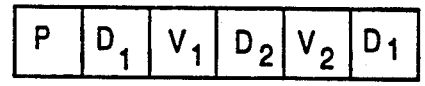

As voice calls are initiated and allocation of the frame to these voice calls take place, slots assigned to the transmission of information from the data sources are reassigned to carry the voice information. An example would be voice V1 and voice V2 are assigned to slots 3 and 5 of the frame. This can be seen in FIG. 9b.

The mask register 62 controls the presentation of voice channels, data channels and the protocol channel to the integrated link T-carrier interface 50 in the following manner. As the integrated link T-carrier interface 50 sequences through the slots of the transmitted frame, multiplexer 100 enables the contents of the corresponding mask register location onto allocation bus line 101. The contents on line 101 are fed into comparators 81, each of which drives a separate output enable line. In the case of voice slots, one of the comparators 81 drives gate 56 to couple voice channels on line 54 to line 52 coupled to integrated link T-carrier interface 50. For data channels, the comparators 81 feed inputs to different AND gates 42.

Each of the AND gates 42 receives at its other input a transmit clock signal over line 53 from the integrated link T-carrier interface 50. The outputs of AND gates 42 correspond to a transmit "stutter" clock that is enabled for the portion of the frame during which the synchronous line interfaces 40 are to provide data over line 52 to integrated line T-carrier interface 50. The number of AND gates required is equal to the number of potential data channels that can be allocated bandwidth in mask register 62. One AND gate 42 is coupled to the transmit protocol message buffer 72a to enable the allocation information to be transferred to the receiving integrated link controller 14.

An embodiment of a receiving integrated link controller 14 is shown in FIG. 7B. The receiving integrated link controller 14 has an integrated link T-carrier interface 50 coupled to the integrated link 16. The input of the integrated link T-carrier interface 50 carries the voice information from the voice channels, the data from the data channels and allocation protocol messages as sent by a transmitting integrated link controller 12. The information received from the integrated link T-carrier interface 50 is carried on line 52 to each of the synchronous line interfaces 40 coupled to the various destinations, and also is carried to a receive protocol message buffer 72b. The voice channels are carried over the same line 52 to the integrated link T-carrier interface 58. The voice channels are provided from the T-carrier interface 58 to a PBX 24B in a conventional manner. The PBX 24B extracts the voice channels from the activated voice slots.

The mask register 62 is loaded by the integrated link processing unit 60 as described in the following paragraphs. The contents of the mask register 62 control how the received frame is to be decomposed into voice information, synchronous data information, and protocol information. As the receive interface of the integrated line T-carrier interface 50 sequences through the slots of the received frame, the multiplexer 100 enables the contents of the corresponding mask register location onto allocation bus line 101. The contents on allocation bus line 101 feed into comparators 81, only one of which will drive an output enable line. In this example, there is no extra control for the voice channels such as gate 56 that was present in the transmit integrated link controller 12 of FIG. 7a. This is because the PBX 24B performs the circuit switching on the entire frame that is passed to the T-carrier interface 58 on line 52. For the data channels, the comparators 81 will feed inputs to different AND gates 42.

Each of the AND gates 42 receives at its other input the line clock signal on line 53 from the integrated link T-carrier interface 50 at its other input The output of AND gates 42 correspond to a receive "stutter" clock that is enabled for the portion of the frame during which the synchronous line interfaces 40 are to receive data from line 52. One AND gate 42 is coupled to the receive protocol message buffer 72b to enable the reception of allocation information from the transmitting integrated link controller 12.

When an entire protocol message has been clocked into the receive protocol message buffer 72b the integrated link processing unit 60 takes the information from the buffer 72b to update the receive mask register 62. The receive mask register 62 is updated at the appropriate frame boundary as indicated by the protocol message so that the receive mask register 62 is in agreement with the allocation of slots arriving at the integrated link T-carrier interface 50.

The above paragraphs described the mechanisms and method for transmitting and receiving of information, which can include protocol information. Different schemes of generating and encoding the protocol information that is sent as described above and specifically the encoding of the allocation mask, are discussed below and compared.

The scheme of encoding the allocation mask (AM) in the integrated link protocol utilized in the embodiment, requires an explicit reference to each allocated link client (i.e., source or destination). If there are (d) data channel clients, including the integrated link protocol channel, (v) voice circuit clients, and (s) total slots, there need to be (b) bits reserved for the AM in a protocol message where:

$$b = s \times LOG2\,(v+d)$$

The integrated link controller presented in FIGS. 7A and 7B will be used to illustrate an embodiment of an "explicit" AM encoding technique. The following is the assignment of binary values for the protocol channel, data channels and voice circuits illustrated in FIGS. 7A and 7B:

Encoding of Bits in AM:
P = Protocol Channel = 000
D1 = Data Channel 1 = 001
D2 = Data Channel 2 = 010
D3 = Data Channel 3 = 011
Vx = Voice Circuits x = 100

This yields a resultant AM with the following contents:
Resultant AM (Contents of Mask Register 62 in FIGS. 7A and 7B.)

| Slot | [1 | 2 | 3 | 4 | 5 | 6] |
|---|---|---|---|---|---|---|
| AM (symbolic) | [P | D1 | Vx | D2 | Vx | D1] |
| AM (ACTUAL) | [000 | 001 | 100 | 010 | 100 | 001] |

Bits Used in Explicit AM Encoding:

$$s = 6, v = 1, d = 4$$
$$b = s \times \log2\,(v + d)$$
$$b = 6 \times \log2\,(1 + 4)$$
$$b = 18 = 6 \times 3$$

In FIGS. 7A and 7B, v=1 since only one circuit client, the PBX 24A, is supported. Subsequently, all of the PBX voice circuits are assigned the same encoding (Vx = 100) since the integrated link controller need only separate all of the voice circuits as a whole from the individual data channels. This is due to the fact that the PBX itself will perform the subsequent circuit switching necessary to divide the total PBX voice circuit bandwidth on the integrated link into the individual voice circuits, as described previously. The above approach allows the integrated link controller to be compatible with industry standard PBX interfaces.

Figure 12:
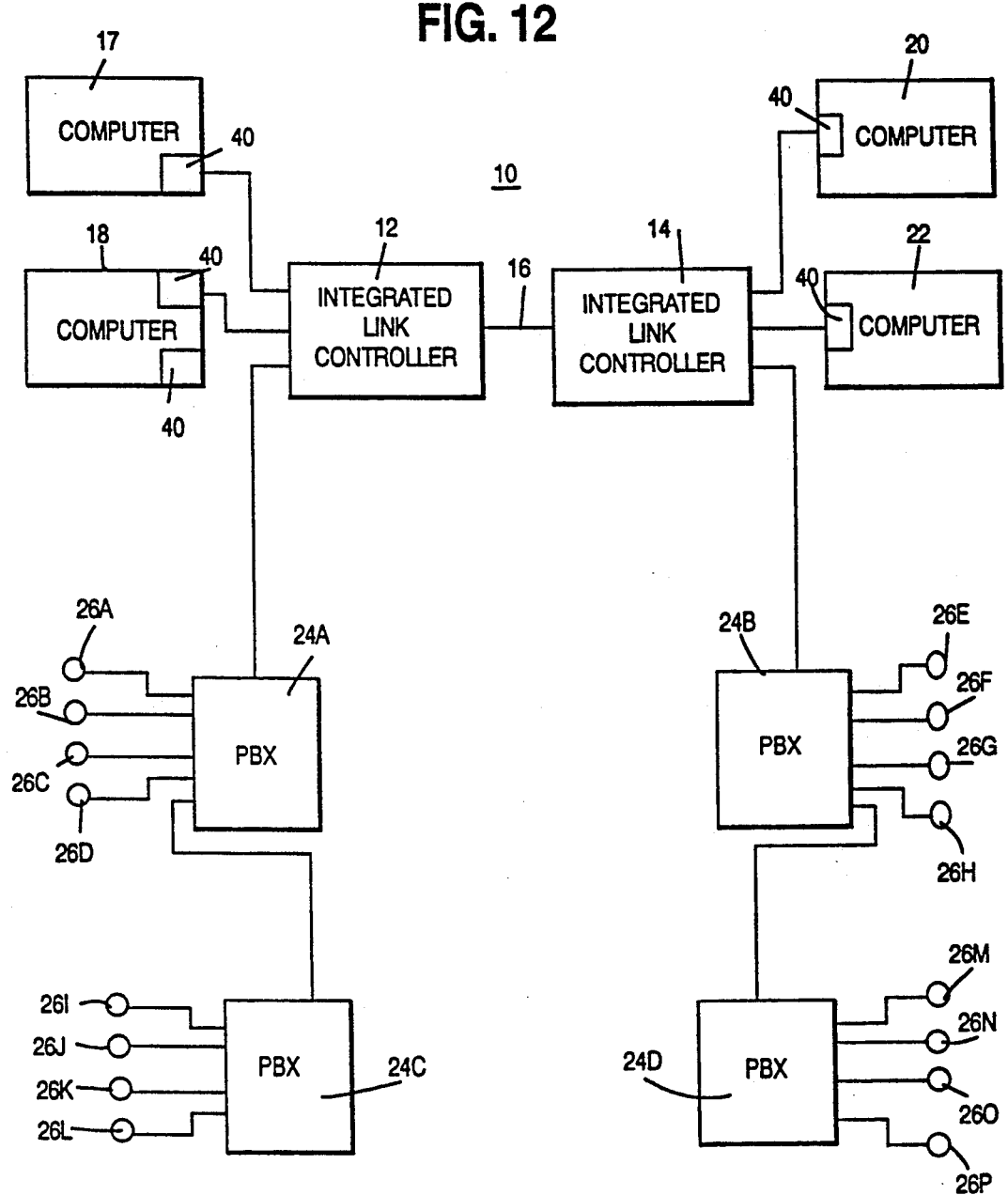
FIG. 12 illustrates another embodiment of the invention, similar to FIG. 2, but having multiple PBXs.

Multiple PBXs are supportable by assigning separate AM mask encodings to each PBX. For example, a second PBX could be assigned $V_y = 101$, a third $V_z = 110$, and so forth. FIG. 12 illustrates two PBXs being controlled by each integrated link controller. This feature can be utilized on higher bandwidth carrier facilities like T3, which offer 44.736 MBits/second per link, since a single PBX may not be able to handle the entire bandwidth of such a high speed channel.

It was noted that explicit encoding requires 18 bits per integrated link protocol message to indicate what type of information each of the 6 slots is carrying (a voice circuit, 1 of 3 user data channels, or the integrated link protocol channel). A method according to the present invention encodes allocation mask information with only two bits per slot plus a synchronization bit per protocol message. This technique relies on constraining two characteristics of the AM exchange between the transmitting and receiving integrated link controllers.

The first constraint is on the ability of the explicit method to select and de-select data channels into and out of service with the integrated link protocol, without affecting the ability of the protocol to re-assign bandwidth among data channels in service. With the explicit method, for example, D3, which is presently out of service, can normally be brought into service with the same ease as the re-assignment of bandwidth to other data channels already in service.

However, the observation is made that the set of data channels in service (the D set) does not change frequently and therefore does not need to be sent in every protocol message. By causing the D set exchange to use a normal handshake verified packet exchange in a data channel outside of the integrated link protocol channel, protocol channel bandwidth is conserved.

Therefore, the protocol channel will only need to be concerned with the apportionment of bandwidth between data channels already in service and not with the activation and deactivation of particular data channels. A single synchronization bit is necessary to select one of two D sets as an in service, active set. Two D sets are necessary so that one can be in service while the other is being updated for use at a future time.

The second characteristic to constrain is the ability of the explicit method to assign bandwidth to individual data channels in any arbitrary order in a frame. That is, instead of allowing the following allocation (e.g., in a frame with no voice circuits allocated):

| Slot | [1 | 2 | 3 | 4 | 5 | 6] |
|------|----|----|----|----|----|----|
| AM | [P | D1 | D1 | D2 | D2 | D1] |

The requirement is made that all data channels be grouped together by channel number:

| Slot | [1 |  | 2 | 3 |  | 4 | 5 |  | 6] |
|------|----|--|----|----|--|----|----|--|----|
| AM | [P |  | D1 | D1 |  | D1 | D2 |  | D2] |
| Group | /- | 1 | -/- |  | 2 |  | -/- | 3 | -/ |

If this constraint is maintained, two binary (1 bit per slot) masks, VDAM (Voice Data Allocation Mask) and DCBM (Data Channel Boundary Mask) could be defined to carry all allocation mask information, other than a D set and D set synchronization bit, in protocol messages, resulting in the assignment of only 2 bits per slot in each integrated link protocol message.

VDAM indicates whether a slot should provide voice circuit or data channel service DCBM is a mask of data channels only, indicating how the members of the D set are to be apportioned bandwidth in a frame from non-voice allocated or free slots.

DCBM in effect describes the allocation of bandwidth to data channels as a set of movable boundaries filled by values from the D set. A DCAM (Data Channel Allocation Mask) is created by the action of the D set filling in the data channel boundaries specified in the DCBM. By creating a logical AND function between the bits in the VDAM an the corresponding data channel values in the DCAM, a resultant AM is generated providing the same information as the originally specified AM in the explicit method. Both of these methods of creating an AM are performed in the integrated link processing unit 60.

Due to the manner by which the DCBM implies allocation by referring to a previously exchanged D set, this method will be referred to as the "implicit" AM encoding technique.

The following example illustrates how a particular VDAM, DCBM and D set of data channels in service are used to create the resultant AM of FIGS. 7A and 7B using the implicit AM encoding technique. In this example, if:

VDAM = [1 = Data, use data channel value derived from DCAM 0 = Voice, use voice circuit value Vx.]

DCBM = [1 = Increment D Set Pointer, then use value in D Set. 0 = Do not increment D Set Pointer, then use value in D Set.]

D Set = [Set of in service data channels used with boundaries specified in DCBM to create DCAM]

| For: | | | | | | |
|------|--|--|--|--|--|--|
| Slot | [1 | 2 | 3 | 4 | 5 | 6] |
| VDAM | [1 | 1 | 0 | 1 | 0 | 1] |
| DCBM | [1 | 1 | 0 | 0 | 1 | 0] |
| P -Bounds | /----/ | | | / | | / |
| D1-Bounds | / | /-----------------/ | | | / | / |
| D2-Bounds | / | / | | | /--------/ | |

(Boundaries are denoted by a DCBM bit = 1)
D Set = [P, D1, D2]

Figure 10:
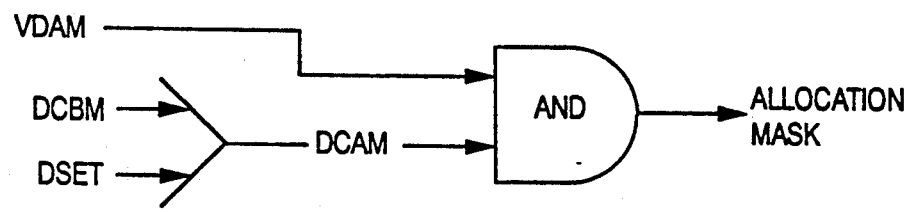
FIG. 10 shows graphically the process of implicit allocation mask encoding.

The process of encoding is illustrated graphically in FIG. 10.

In the above example, the DCAM created by combining the D Set with the boundaries specified in DCBM is

[P D1 D1 D1 D2 D2]

The resultant AM (allocation mask) is formed by ANDing the DCAM with the VDAM. In this example, the AM is

[P D1 Vx D1 Vx D2]

The resultant AM, derived implicitly in this embodiment of the invention, contains the same information as the original explicit AM. The position dependent requirement of the voice circuit slots has been maintained, though the order of some of the data channel values has been changed (slot 4 contained D2 and slot 6 contained D1). This is consistent, however, with the ability of the invention to provide position independent bandwidth to data channels.

The voice circuit slots are position dependent in that the PBX relies on each one maintaining a fixed position in the frame in order to locate them and distinguish them from each other. However, the data channels are not position dependent and can be allocated in any manner that would increase the efficiency of an AM exchange.

Implicit encoding, described above, used 2 bits per slot plus a D set synchronization bit, so the total number of bits, t, required to support bandwidth allocation was:

$$t = (s \times 2) + 1$$

$$t = 13 = (6 \times 2) + 1$$

The explicit method required 38% more bits (18) than the implicit method (13). This represents a 27% savings of the implicit over the explicit method.

For d=4, v=1, s=24 (i.e., a full T1 frame):

(Explicit Method)

$$b = s \times \log2 (v+d)$$

$$b = 24 \times \log 2 (1+4)$$

$$b = 72 = 24 \times 3$$

(Implicit Method)

$$t = (s \times 2) + 1$$

$$t = 49 = (24 \times 2) + 1$$

Thus, for a full T1 frame, there is a 31% savings over the explicit method which would require 46% more bits than the implicit method.

Figure 11:
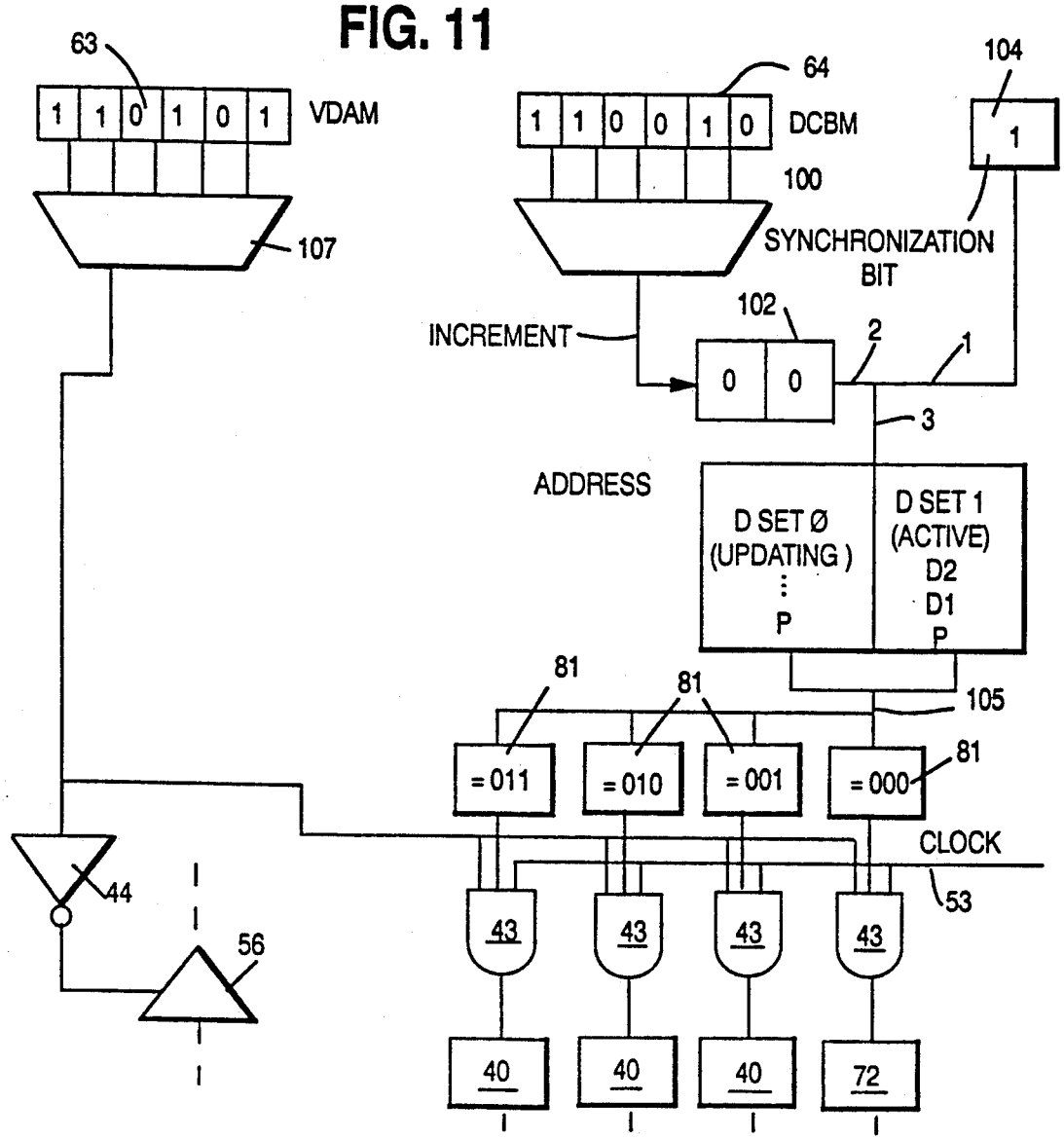
FIG. 11 illustrates a portion of the integrated link controllers of FIGS. 7a and 7b that are modified to permit implicit allocation mask encoding.

FIG. 11 illustrates how the implicit mechanism would be implemented to replicate the less efficient explicit AM allocation function in the embodiments of FIGS. 7A and 7B.

The VDAM (Voice Data Allocation Mask), sent in each protocol message, is stored in a VDAM register 63 and indicates whether a slot is to provide voice circuit or data channel service At each slot time, the output of a multiplexer 107 is used to enable one of the three input AND gates 43 for data channel operation, depending on the outputs of comparators 81, or enable a voice circuit to utilize the integrated link by turning on gate 56 of FIG. 7A, through inverter 44. The AND gates 43 provide the same stutter clocking described as part of the embodiment of FIGS. 7A and 7B.

The DCBM (Data Channel Boundary Mask), also sent in each protocol message, is stored in a DCBM register 64 and indicates whether a D set pointer 102 should be incremented or remain at its present value at each slot time. If incremented, a new data channel value will be read from a D set memory 106 onto line 105, forming the DCAM (Data Channel Allocation Mask) entry for that slot, analogous to the value present on line 101 of the explicit encoding technique illustrated in FIGS. 7A and 7B. If it is not incremented, the present data channel value pointed to in the D set memory 106 will be used for that slot time.

The D set memory 106 holds both an active D set and a D set being updated for use at a future time. A synchronization bit in the protocol message that is stored in a synchronization bit register 104, indicates which D set is the active one. In this example, D set 1 is active since register 104 contains a 1. The D set pointer 102 and synchronization bit 104 form a 3 bit address that is input into the D set memory 106.

The active D set in memory 106 and the DCBM in register 64 are used to create DCAM, as described previously. The DCAM does not reside in a register, but each value of the DCAM for each slot is made available on line 105 for subsequent use by comparators 81 in order to determine which AND gate 43 should be turned on, if any. As mentioned previously, any request for a slot by the DCAM can only be granted if there is a free slot, that is if the value from the VDAM multiplexer 107 is a 1 for that particular slot, indicating that no voice circuit is being requested by the PBX 24a.

Two additional constraints are made in order to lower protocol channel overhead even further in another embodiment according to the invention. Many existing communication networks are not designed to operate with or efficiently utilize the ability to dynamically re-assign data channel bandwidth among data clients at high speeds, as the integrated link protocol allows. The approaches of the present invention provide a great deal of utility to present systems while supporting additional protocol channel efficiency.

The first constraint is on the ability of the implicit method to re-assign bandwidth at high speeds utilizing protocol messages among data channels in service. This would be accomplished by exchanging both the DCBM mask an the D set through normal handshake verified packet exchange in a data channel outside of the integrated link protocol channel, and only send VDAM and the synchronization bit in the protocol The synchronization bit would be needed in order to pick an active DCBM, along with a corresponding D set.

This would lower the protocol bandwidth needed to convey bandwidth allocation to 1 bit per slot (VDAM) and 1 synchronization bit. Dynamic allocation between the voice circuits and data channels would be supported as before, however, the set of in service data channels and allocation of in service data channels could be changed only by utilizing the slower exchange mechanism outside of the integrated link protocol channel. One possible use for this scheme would be to specify a primary set of data channels and a back-up set used to provide fault tolerance in a system.

The second constraint eliminates the ability of the implicit method to re-assign bandwidth among data channels in service and to specify new sets of data channels in service. This would be accomplished by utilizing a fixed DCBM mask and D set, and sending only VDAM in the protocol.

This would lower the protocol bandwidth needed to convey bandwidth allocation to 1 bit per slot (VDAM). Dynamic allocation between the voice circuits and data channels would be supported as before, however, the set of data channels in service and allocation of data channels in service would remain fixed.

The protocol used in the present invention provides for dynamic allocation of the bandwidth among the different types of information traffic carried on the integrated link 16. As described above, the allocation of the slots among the various channels is determined by the allocation mask. In order for transmission to operate properly, both the transmitting and receiving integrated link controllers 12, 14 must have identical copies of the allocation masks in a synchronous manner. To achieve the full benefit of integration of voice and data information on a single link, the masks must be changed dynamically in response to the fluctuating demands for the voice circuits, according to a pre-determined policy. The protocol maintains synchronization of the allocation masks at the transmitter and the receiver without disrupting the ongoing use of the channel, even as these masks are dynamically changed.

The transmitting integrated link controller 12 uses the allocation mask to multiplex voice and data information into their allocated slots in a frame, while the receiving integrated link controller 14 uses its mask to pick apart the received frames. The system will only operate correctly if the mask at the transmitting integrated link controller 12 and the receiving integrated link controller 14 are synchronized In other words, the mask at the receiving integrated link controller 14 that is used to pick apart a given frame must be identical to the mask used at the transmitting integrated link controller 12 to multiplex voice and data information into that frame.

The synchronization is achieved by the allocation protocol whose function is to change the masks at the transmitting and receiving integrated link controllers 12, 14 synchronously, and to ensure that they remain synchronized when the allocation is not changing The following is a description of the operation of the protocol channel and its parameters. The protocol information is designed to change the allocation of the link reliably in the face of errors. The probability of switching over to an incorrect allocation is much lower than the probability of errors on the channel. By protecting the protocol channel with a Cyclic Redundancy Code (CRC) the probability of an undetected error in the protocol frame would be approximately 10 E-18 as compared to an error rate of 10 E-6 for the T1 link itself. In the embodiment, R is the reliability of this mechanism (i.e., detecting an error in the protocol channel). Thus, if the CRC is correct, there is an extremely high probability that the information (i.e., the encoding of the allocation mask and the frame at which the switch is to be made) is also correct.

The protocol channel provides a mechanism by which the percentage of control traffic can be adjusted without affecting the reliability of the protocol transfer mechanism. The control overhead (c) can be expressed as a fraction of the channel bandwidth B. In the illustrated embodiment, the control overhead comprises an entire slot, equal to 8 bits. The bandwidth of the protocol channel, however, can be such that it takes up any number of bits in any number of frames. This is also true for any of the data channels and voice circuit channels. For example, 48 four bit slots could be defined on a T1 link versus the more standard 24 eight bit slots.

The invention provides a mechanism that allows the change of channel allocation as fast as possible subject to the constraints of reliability R and channel overhead c. For the illustrated embodiment of the present invention, D is the delay between the inception of a request for a change in allocation and the time the transmitting integrated link controller 12 switches over to the new allocation mask. The receiving integrated link controller 14 will switch over to the new allocation mask one link propagation delay after the transmitting integrated link controller does. The amount of bandwidth assigned to the protocol channel determines how quickly allocation information can be transmitted to the receiving integrated link controller 14 and how quickly the allocation mask can be updated.

The characteristics of the protocol channel are controlled by the setting of the parameters R, C, D, B and S (the number of slots within the frame). The present invention allows for fixing some of these parameters and leaving others to be adjusted by the users of the integrated link channel.

The present invention guarantees that if the transmitting integrated link controller 12 switches over to a new allocation at time T, the receiving integrated link controller 14 also switches over to the new allocation at time T+link propagation delay with reliability R. To maintain the notion of synchronization with respect to time (i.e., frame synchronization) the protocol does not acknowledge the transmitter to the protocol information frames, but responds drastically to errors in the protocol channel The present invention uses redundancy techniques on the transmitter side (12) and error detection, selection, and recovery at the receiver side (14).

In the invention, the protocol channel normally contains the information that will allow the specification of an allocation mask. When a transmitting integrated link controller 12 decides to change the allocation of slots within a frame it sends the information to generate a new allocation mask up to N times in the control channel. The protocol information is sent each time with a CRC that detects an error in the allocation information with high probability. Each of these N messages sent also contains the time q at which the receiving integrated link controller should switch over the new allocation mask.

An example of how to specify this time q would be to consider the T1 system where time can be measured in terms of frames. Assume it takes F frames to send the appropriate allocation information with its CRC and other information. To send the N allocation messages for redundancy would take N * F frames. When the transmitting integrated link controller 12 send the first allocation message it specifies for the receiving integrated link controller 14 that it should switch over in $q = (N) * F + 1$ frames in the future. Similarly, the second allocation message sent should specify a time in the future In this way, the invention provides for allocation messages to say the same thing in that they point to the same time in the future. Thus, protocol messages are "idempotent" and if the receiving integrated link controller 14 receives one or more of these N messages with a correct CRC, the receiver will switch over correctly to the new allocation at the specified frame (time) in the future.

Because the messages sent by the transmitting integrated link controller 12 are idempotent, if the receiving integrated link controller 14 gets one or more of the N messages sent with a correct CRC it switches over to the new allocation. The invention prescribes that if the receiving integrated link controller 14 receives N CRC errors in a row, the receiver cannot be sure of the allocation desired by the transmitting integrated link controller 12. The integrated link processor unit 60 detects this occurrence, and provides notification in a conventional manner that the integrated link channel is broken. The receiving integrated link controller 14 cannot process received frames correctly until an allocation packet with correct CRC is received and the frame pointed to by this allocation packet arrives In the event that the number of CRC errors in a period of Y frames exceeds some threshold value I, the present invention will reset the channel and notify the customers of the integrated link channel in a conventional manner.

If the allocation of slots within the integrated link 16 does not change, the transmitting integrated link controller can periodically resend the current allocation information with a time of F+1 frames in the future. This redundant transmission of the allocation information provides a self-stabilizing property in that no matter how bad the channel was in the past, the statistical multiplexing system will stabilize in finite time after the channel stops malfunctioning due to excessive bit error rates.

For an example of protocol channel use, an entire T1 frame using explicit allocation mask encoding will be described where v=1, d=1, s=24 slots and the protocol is allocation to the first 8 bits of each frame in a static manner. Since the protocol is allocated in a static manner, no allocated information is necessary to convey the size of the protocol channel, thus providing a simpler example with which to illustrate the protocol operation.

To calculate the allocation mask size, there are b=24 * log 2 (1+1)=24 bits or 3 bytes. An additional byte is needed to specify q and two more bytes for CRC which defines a protocol message of total length 6 bytes. As mentioned above, since one slot is equal to one byte, six slots are needed to transmit the protocol packet. In a trade-off of bandwidth (B) versus speed (D), the described embodiment of the preferred invention sends the allocation information in the protocol packet in successive frames, one byte at time. Thus, it takes six frames before the entire protocol packet is sent by a transmitting integrated link controller 12. Alternatively, more or less than one slot can be assigned to the protocol channel, (i.e., overhead c) to provide faster or slower transfer of allocation information and switching of the allocation mask.

FIG. 8 illustrates the six consecutive frames sent by a transmitting integrated link controller 12. The first slot in each frame contains one byte of a protocol packet of information. The first three frames contain encoded information describing the allocation mask. The fourth frame contains the number of frames q from the first frame of this sequence of frames (that make up a packet) at which time the mask is to be changed. The frames 5 and 6 contain the CRC for the protocol packet. Thus, it can be seen that the protocol packet is sent vertically over several frames, rather than horizontally in a single frame. Note that the remaining 23 slots in each frame can continue to be used for voice or data channels.

It is assumed for this example that to achieve an adequate level of robustness that the transmitting integrated link controller 12 will send the packet three times (i.e., N=3). Therefore, it will take 18 frames to send a new mask to the receiver. The transmitting integrated link controller 12 decides at frame J to change the allocation masks. Beginning at frame (J+1), which is the first frame of the first protocol packet, the transmitting integrated link controller 12 sends an allocation information packet essentially saying "change to the new mask 18 frames after the first frame of this protocol packet." Beginning at frame (J+7), the transmitting integrated link controller 12 will send a second protocol packet saying "change to the new mask 12 frames after the first frame of this protocol packet". Beginning at frame (J+13), it sends a third packet saying "change to the new mask 6 frames after the first frame of this protocol packet." The transmitting integrated link controller 12 and the receiving integrated link controller 14 switch to the new mask beginning with frame (J+19).

Even if only one of the three packets is received correctly by the receiving integrated link controller 14, as determined by the CRC checking, the new mask can be set correctly at the proper frame. However, in the event that all three packets have CRC errors, as previously described, mask synchronization is no longer guaranteed. In the exemplary embodiment, the receiving integrated link controller 14 will therefore invoke an error handling procedure. A typical error handling procedure forces a re-initialization of the link, which is a drastic response, but is appropriate behavior for a link exhibiting unusually high noise characteristics.

The worst case probability that the protocol would incorrectly allocate the link bandwidth occurs when a bad protocol message is not caught by the CRC check (10 E-18) and the reset (N-1) of the protocol messages sent in a particular allocation sequence are in error (10 E-6 line error rate), however, these are caught with CRC checks The probability, Pe, that incorrect allocation occurs is then:

$$Pe = 10\ E\text{-}18 \times (10\ E\text{-}6)\ E\ (N\text{-}1)$$

For N=3 this becomes:

$$Pe = 10\ E\text{-}18 \times (10\ E\text{-}6)\ E2$$

$$Pe = 10\ E\text{-}18 \times 10\ E\text{-}12$$

$$Pe = 10\ E\text{-}30$$

The reliability of the link allocation is then:

$$R = 1 - Pe$$

For N=3 this becomes:

$$R = 1 - 10\ E\text{-}30$$

This indicates that the example used provides a very reliable allocation mechanism. In addition, the CRC error rate can be used to monitor the quality of the integrated link as an added network management benefit.

As can be seen from the above description, the changing of the allocation mask is transparent such that the remaining bandwidth of the integrated link 16 can continue to carry useful information between the transmitting integrated link controller 12 and the receiving integrated link controller 14. In the example given above, in which a protocol packet can be sent three times in eighteen frames, it will take only 2.25 milliseconds to change the allocation mask. This is adequate for many real-time allocations.

The vertical nature of the protocol packets allow the bandwidth (or control overhead), the speed of switching masks, and robustness (ensuring of accuracy) to be traded off against each other to suit a wide range of performance requirements. For example, the protocol can be used to match a range of configurations including either PCM or ADPCM speech encoding schemes, and any frame format and any transmission rate such as American DSI, or European CEPT.

A future feature of the present invention allows the protocol channel to configure the link in voice only or data only modes so that control overhead is eliminated altogether. This would be used only for systems in which dynamic allocation of bandwidth is not used. Link initialization would then be used to restart dynamic link operation.

The speed of mask re-allocation allows the integrated link to utilize silence detection in order to reclaim unused voice circuit bandwidth for use in the data channels. For example, when one person is finished speaking on a voice channel, a measurable pause can be detected The switching of allocation masks can be performed with the present invention fast enough to make it worthwhile to use the bandwidth of that voice channel to transmit data until that voice channel is needed again. When the other person starts talking after the pause, the bandwidth allocated to the data channel will be reallocated to the voice channel, at a speed fast enough so as to be invisible to the coversants.

What is claimed is:

1. A system to carry multiple types of information in a multiplexed manner in a framed format, on a multiplexed integrated link, each frame of the framed format being divided into portions, comprising:

at least two integrated link controllers, each integrated link controller operable as a transmitter and a receiver to transmit and receive a plurality of information signals in each frame, each information signal occupying an allocated amount of bandwidth in at least one portion of each frame;

means for dynamically changing the allocation of the bandwidth of each information signal;

means for generating error control information that is transmitted from an integrated link controller operating as a transmitter to an integrated link controller operating as a receiver;

means for allocating the bandwidth of each individual information signal among a plurality of contiguous portions of said frame when the bandwidth of the individual information signal is at least as small as any unoccupied contiguous portions of said frame and among a plurality of non-contiguous portions of said frame when the bandwidth of the individual information signal is larger than all unoccupied contiguous portions of said frame.

2. The system of claim 1, wherein said portions are slots of a preselected bandwidth.

3. The system of claim 1, wherein said multiplexed integrated link is a time multiplexed integrated link.

4. The system of claim 1, wherein each said integrated link controller includes a mask register that holds an allocation mask indicating the allocated amount of bandwidth in a frame for each information signal.

5. The system of claim 4, wherein each mask register includes an input to receive the allocation mask, said mask register input being coupled to said means for dynamically changing the allocation of the bandwidth.

6. The system of claim 5, wherein one of said types of information is data provided to a synchronous line interface and said means for allocating the bandwidth includes means for selectively coupling a data clocking signal to said synchronous line interface only when said data is being provided to said synchronous line interface.

7. The system of claim 6, wherein said integrated link includes a line clock signal and the means for providing data clocking signal includes an AND gate having one input coupled to the integrated link to receive a line clock signal, and another input coupled to the mask register to receive a clock enable signal dependent on the allocation mask in the mask register.

8. The system of claim 5, wherein one portion of said frame is a protocol portion having a dynamically allocatable bandwidth.

9. The system of claim 8, wherein said integrated link controller transmits protocol information in a protocol packet in a vertical manner over a plurality of frames.

10. The system of claim 9, wherein each protocol packet includes an allocation mask.

11. The system of claim 10, wherein the protocol packet further includes switch frame information that indicates to the integrated link controller acting as a receiver at which frame the allocation mask is to be used.

12. The system of claim 11, wherein the means for dynamically changing the allocation of the bandwidth further includes a protocol message buffer in each integrated link controller that is coupled to the integrated link to receive the protocol packet.

13. The system of claim 12, wherein the means for dynamically changing the allocation of the bandwidth further includes an integrated link processing control coupled between each protocol message buffer and its associated mask register, the integrated link processing control setting the mask register in accordance with the protocol message buffer 14. The system of claim 13, wherein the protocol packet further includes said error control information.

15. The system of claim 14, wherein the error control information includes cyclic redundancy check information.

16. The system of claim 15, wherein the protocol packet is explicitly encoded with $s \times \log2 (v+d)$ bits per allocation mask per protocol packet, where s is the number of total slots in a frame, v is a number of voice circuits, and d is a number of data channels.

17. The system of claim 15, wherein the protocol packet is implicitly encoded with $(s \times 2)+1$ bits per allocation mask per protocol packet, where s is the total number of slots in a frame.

18. The system of claim 15, wherein the protocol packet is implicitly encoded with $(s \times 1)+1$ bits per allocation mask per protocol packet, where s is the total number of slots in a frame.

19. The system of claim 15, wherein the protocol packet is implicitly encoded with $(s \times 1)$ bits per allocation mask per protocol packet, where s is the total number of slots in a frame.

20. The system of claim 1, wherein the error control information includes cyclic redundancy check information.

21. A system to carry multiple types of information in a multiplexed manner on a multiplexed integrated link, in a framed format, each frame of the framed format being divided into portions, comprising:

at least two integrated link controllers that are couplable to an integrated link, such integrated link controller operable as a transmitter and a receiver to transmit and receive a plurality of information signals in each frame, each information signal occupying an allocated amount of bandwidth in at least one portion of each frame;

means for dynamically changing the allocation of the bandwidth of each information signal;

means for generating error control information that is transmitted from an integrated link controller operating as a transmitter to an integrated link controller operating as a receiver;

means for checking error control information in the integrated link controller operating as a receiver;

means for allocating the bandwidth of each individual information signal among a plurality of contiguous and noncontinguous portions of said frame;

a set of information signal sources coupled to one of said integrated link controllers, and a set of information signal destinations coupled to the other of said integrated link controllers.

22. The communications system of claim 21, wherein the set of information signal sources includes a set of data sources and a set of voice sources, and the set of information signal destinations includes a set of data destinations and a set of voice destinations.

23. The communications system of claim 22, further comprising a first private branch exchange unit coupled between the set of voice sources and one of the integrated link controllers, and a second private branch exchange unit coupled between the set of voice destinations and the other of said integrated link controllers.

24. The communications system of claim 23, further comprising a synchronous line interface in each of said data sources and data destinations, each said synchronous line interface being coupled to one of said integrated link controllers.

25. The system of claim 24, wherein each synchronous line interface and each private branch exchange unit are conventional.

26. The system of claim 25, wherein each mask register includes an input to receive the allocation mask, said mask register input being coupled to said means for dynamically changing the allocation of the bandwidth.

27. The system of claim 26, wherein one of said types of information is data provided to the synchronous line interface and said means for allocating the bandwidth includes means for selectively coupling a data clocking signal to said synchronous line interface only when said data is being provided to said synchronous line interface.

28. The system of claim 27, wherein the means for providing data clocking signals includes an AND gate having one input coupled to the integrated link to receive a line clock signal, and another input coupled to the mask register to receive a clock enable signal dependent on the allocation mask in the mask register.

29. The system of claim 26, wherein one portion of said frame is a protocol portion having a dynamically allocatable bandwidth.

30. The system of claim 29, wherein said integrated link controller transmits protocol information in a protocol packet in a vertical manner over a plurality of frames.

31. The system of claim 30, wherein each protocol packet includes the allocation mask.

32. The system of claim 31, wherein the protocol packet further includes switch frame information that informs the integrated link controller acting as a receiver at which frame the allocation mask is to be used.

33. The system of claim 32, wherein the means for dynamically changing the allocation of the bandwidth further includes a protocol message buffer in each integrated link controller that is coupled to the integrated link to receive the protocol packet.

34. The system of claim 33, wherein the means for dynamically changing the allocation of the bandwidth includes an integrated link processing control coupled between each protocol message buffer and its associated mask register, the integrated link processing control setting the mask register in accordance with the protocol message buffer.

35. The system of claim 34, wherein the protocol packet further includes said error control information.

36. The system of claim 35, wherein the error control information includes cyclic redundancy check information.

37. The system of claim 36, wherein the protocol packet is explicitly encoded with x×log2 (v+d) bits per allocation mask per protocol packet, where s is the number of total slots in a frame, v is a number of voice circuits, and d is a number of data channels.

38. The system of claim 36, wherein the protocol packet is implicitly encoded with (s×2) +1 bits per allocation mask per protocol packet, where s is the total number of slots in a frame.

39. The system of claim 36, wherein the protocol packet is implicitly encoded with (s×1)+1 bits per allocation mask per protocol packet, where s is the total number of slots in a frame.

40. The system of claim 36, wherein the protocol packet is implicitly encoded with (s×1) bits per allocation mask per protocol packet, where s is the total number of slots in a frame.

41. The system of claim 21, wherein the error control information includes a cyclic redundancy check.

42. A method of switching the allocation of bandwidth of information signals in a transmitting integrated link controller and a receiving integrated link controller coupled by a time division multiplexed link that carries multiple information signals in a framed format, each frame in said framed format being divided into slots of a preselected bandwidth, an allocation mask stored in a mask register indicating the number of slots each information signal is allocated, comprising:
sending protocol information from said transmitting integrated link controller in protocol packets and transmitted over a plurality of frames, each protocol packet containing an allocation mask, and error control information, each protocol packet being transmitted over a plurality of frames;
receiving said protocol packets in said receiving integrated link controller; and
using the received allocation mask to dynamically switch the allocation of the bandwidth.

43. The method of claim 42, wherein the protocol packet contains switch frame information that indicates at which frame the receiving integrated link controller is to begin using the allocation mask contained in the received protocol packet.

44. The method of claim 43, wherein the switch frame information is a number of frames after a specified frame at which the receiving integrated link controller is to use the received allocation mask.

45. The method of claim 44, wherein each protocol packet contains cyclic redundancy check information for that protocol packet, and further comprising performing a cyclic redundancy check using said cyclic redundancy check information.

46. The method of claim 45, further comprising redundantly sending particular protocol information in a set of successive protocol packets.

47. The method of claim 46, wherein the step of using the received allocation mask includes loading a mask register with the allocation mask if the cyclic redundancy check information for any one of the set of successive protocol packets is correct.

48. The method of claim 47, further comprising reinitializing the transmitting integrated link controller and the receiving integrated link controller when a predetermined number of successive protocol packets contain incorrect cyclic redundancy check information.

49. The method of claim 48, wherein the multiple information signals include a number of voice signals and a set of data signals.

50. The method of claim 49, further comprising establishing priority of voice signals over data signals, such that the bandwidth allocated to the set of data signals is reduced when the number of voice signals to be carried over said multiplexed link is increased.

51. The method of claim 50, further comprising increasing the bandwidth allocated to the set of data signals when the number of voice signals carried over the multiplexed link is decreased.

52. The method of claim 51, further comprising: detecting silence in a particular voice signal, increasing the bandwidth allocated to the set of data signals and reducing the bandwidth allocated to the particular voice signal; detecting a resumption of the particular voice signal; and decreasing the bandwidth allocated to the set of data signals and increasing the bandwidth allocated to the particular voice signal.

53. The method of claim 52, wherein the protocol information is sent in a protocol channel with dynamically changeable bandwidth in said frames.

54. The method of claim 42, wherein each protocol packet contains reliability information indicating the reliability of the allocation mask, and further comprising performing a reliability check using said reliability information.

55. The method of claim 54, wherein the reliability information is cyclic redundancy check information.

56. The method of claim 55, further comprising monitoring the quality of the time division multiplexed link using the cyclic redundancy check information.

57. The method of claim 42, further comprising repeatedly sending the same allocation mask after said allocation mask is used to dynamically switch the allocation of the bandwidth such that the allocating of bandwidth is self-stabilizing.

58. The method of claim 57, further comprising sending protocol information that includes information which causes said protocol information to no longer be sent in subsequent frames.

59. The method of claim 42, wherein the reliability of the switching of the allocation of the bandwidth is adjustable and related to bandwidth of the protocol information and a speed of switching the allocation of the bandwidth.

60. A controller for a system of the type capable of carrying multiple types of information in a multiplexed manner in a framed format, each frame of the framed format being divided into portions, the system capable of having a link joining at least two of the controllers, the controller comprising:
 transmission means for transmitting and receiving a plurality of information signals in each frame, each information signal occupying an allocated amount of bandwidth in at least one portion of each frame;
 means for dynamically changing the allocation of the bandwidth of each information signal;
 means for generating error control information, said error control information capable of being transmitted from a controller operating as a transmitter to a controller operating as a receiver; and,
 means, responsive to said means for dynamically changing the allocation of the bandwidth and responsive to said means for generating error control information, for allocating the bandwidth of each individual information signal among a plurality of contiguous and non-contiguous portions of said frame.

61. The system of claim 60, wherein said portions are slots of a preselected bandwidth.

62. The system of claim 60, wherein one portion of said frame is a protocol portion having a dynamically allocatable bandwidth.

63. The system of claim 60, wherein said integrated link controller transmits protocol information in a protocol packet in a vertical manner over a plurality of frames.

64. The system of claim 63, wherein the protocol packet further includes said error control information.

65. A system to carry at least three types of information in a multiplexed manner in a framed format, on a multiplexed integrated link, each frame of the framed format being divided into portions, comprising:
 at least two integrated link controllers, each integrated link controller operable as a transmitter and a receiver to transmit and receive a plurality of information signals in each frame, each information signal occupying an allocated amount of bandwidth in at least one portion of each frame;
 means for dynamically changing the allocation of the bandwidth of each information signal;
 means for generating error control information that is transmitted from an integrated link controller operating as a transmitter to an integrated link controller operating as a receiver;
 means for checking error control information in the integrated link controller operating as a receiver; and
 means for allocating the bandwidth of each individual information signal among a plurality of contiguous and non-contiguous portions of said frame.

66. A system to carry multiple types of information in a multiplexed manner on a multiplexed integrated link, in a framed format, each frame of the framed format being divided into portions, comprising:
 at least two integrated link controllers that are couplable to an integrated link, such integrated link controller operable as a transmitter and a receiver to transmit and receive a plurality of information signals in each frame, each information signal occupying an allocated amount of bandwidth in at least one portion of each frame;
 means for dynamically changing the allocation of the bandwidth of each information signal;
 means for generating error control information that is transmitted from an integrated link controller operating as a transmitter to an integrated link controller operating as a receiver;
 means for checking error control information in the integrated link controller operating as a receiver;
 means for allocating the bandwidth of each individual information signal among a plurality of contiguous portions of said frame when the bandwidth of the individual information signal is at least as small as any unoccupied contiguous portions of said frame and among a plurality of non-contiguous portions of said frame when the bandwidth of the individual information signal is larger than all unoccupied contiguous portions of said frame;
 a set of information signal sources coupled to one of said integrated link controllers, and a set of information signal destinations coupled to the other of said integrated link controllers.

67. A controller for a system of the type capable of carrying multiple types of information in a multiplexed manner in a framed format, each frame of the framed format being divided into portions, the system capable of having a link joining at least two of the controllers, the controller comprising:
 transmission means for transmitting and receiving a plurality of information signals in each frame, each information signal occupying an allocated amount of bandwidth in at least one portion of each frame;
 means for dynamically changing the allocation of the bandwidth of each information signal;
 means for generating error control information, said error control information capable of being transmitted from a controller operating as a transmitter to a controller operating as a receiver; and, means, responsive to said means for dynamically changing the allocation of the bandwidth and responsive to said means for generating error control information, for allocating the bandwidth of each individual information signal among a plurality of contiguous portions of said frame when the bandwidth of the individual information signal is at least as small as any unoccupied contiguous portions of said frame and among a plurality of non-contiguous portions of said frame when the bandwidth of the individual information signal is larger than all unoccupied contiguous portions of said frame.

68. A system to carry at least three types of information in a multiplexed manner in a framed format, on a multiplexed integrated link, each frame of the farmed format being divided into portions, comprising:

at least two integrated link controllers, each integrated link controller operable as a transmitter and a receiver to transmit and receive a plurality of information signals in each frame, each information signal occupying an allocated amount of bandwidth in at least one portion of each frame;

means for dynamically changing the allocation of the bandwidth of each information signal;

means for generating error control information that is transmitted from an integrated link controller operating as a transmitter to an integrated link controller operating as a receiver;

means for checking error control information in the integrated link controller operating as a receiver; and means for allocating the bandwidth of each individual information signal among a plurality of contiguous portions of said frame when the bandwidth of the individual information signal is at least as small as any unoccupied contiguous portions of said frame and among a plurality of non-contiguous portions of said frame when the bandwidth of the individual information signal is larger than all unoccupied contiguous portions of said frame.

* * * * *